(12) United States Patent
Dill et al.

(10) Patent No.: US 7,464,078 B2
(45) Date of Patent: Dec. 9, 2008

(54) METHOD FOR AUTOMATICALLY EXTRACTING BY-LINE INFORMATION

(75) Inventors: Stephen Dill, San Jose, CA (US); Madhukar R. Korupolu, Sunnyvale, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 11/259,608

(22) Filed: Oct. 25, 2005

(65) Prior Publication Data

US 2007/0094232 A1    Apr. 26, 2007

(51) Int. Cl.
G06F 17/30 (2006.01)
(52) U.S. Cl. ............... 707/3; 707/2; 715/234; 715/249
(58) Field of Classification Search ........ 707/3, 707/1, 2; 715/234, 249
See application file for complete search history.

(56) References Cited

U.S. PATENT DOCUMENTS

| | | | |
|---|---|---|---|
| 6,735,586 B2 | 5/2004 | Timmons | |
| 6,836,768 B1 | 12/2004 | Hirsch | |
| 6,924,828 B1 | 8/2005 | Hirsch | |
| 7,152,058 B2* | 12/2006 | Shotton et al. | 707/3 |
| 7,240,067 B2* | 7/2007 | Timmons | 707/101 |
| 7,363,294 B2* | 4/2008 | Billsus et al. | 707/3 |
| 2002/0099695 A1* | 7/2002 | Abajian et al. | 707/3 |
| 2002/0099696 A1* | 7/2002 | Prince | 707/3 |
| 2004/0111400 A1* | 6/2004 | Chevalier | 707/3 |
| 2005/0165789 A1* | 7/2005 | Minton et al. | 707/10 |
| 2008/0077582 A1* | 3/2008 | Reed | 707/5 |
| 2008/0148144 A1* | 6/2008 | Tatsumi | 715/235 |

FOREIGN PATENT DOCUMENTS

JP    200300673 A1    10/2004

OTHER PUBLICATIONS

Holovaty, Adrian. "Page titles on news article pages," Holovaty.com, Oct. 25, 2002, http://www.holovaty.com/blog/archive/2002/10/25/1741.*

Johansson, Roger. "Document titles and title separators," Oct. 19, 2004, http://web.archive.org/web/20041113212131/www.456bereastreet.com/archive/200410/document_titles_and_title_separators/.*

(Continued)

*Primary Examiner*—James K. Trujillo
*Assistant Examiner*—Justin Kneitel
(74) *Attorney, Agent, or Firm*—Shimokaji & Associates, P.C.

(57) ABSTRACT

A by-line extraction method detects a set of potential headlines from a title meta-tag of a crawled document, selects a candidate headline from the set of potential headlines, and extracts the by-line information from the document using the location of the selected candidate headline. The method constructs the set of potential headlines based on the title meta-tag. The method selects a candidate headline by evaluating the set of potential headlines in order of the lengths of the potential headlines. The method extracts the by-line information from the document by using the location of the selected candidate headline to extract a string representing a date, a name, or a source located within a minimum distance from the location of the potential headline.

5 Claims, 6 Drawing Sheets

OTHER PUBLICATIONS

Hu, Yunhua. Xin, Guomao. Song, Ruihua. Hu, Guoping. Shi, Shuming. Cao, Yunbo. Li, Hang. "Title extraction from bodies of HTML documents and its application to web page retrieval," Proceedings of the 28th annual international ACM SIGIR conference on Research and development in information retrieval, Aug. 15-19, 2005, Salvador, Brazil.*

Paynter, Gordon W. "Developing practical automatic metadata assignment and evaluation tools for internet resources," Proceedings of the 5th ACM/IEEE-CS joint conference on Digital libraries, Jun. 7-11, 2005, Denver, CO, USA.*

Agyemang, Malik. Barker, Ken. Alhajj, Rada. "Mining Web Content Outliers using Structure Oriented Weighting Techniques and N-Grams," Proceedings of the 2005 ACM symposium on Applied computing, 2005, Santa Fe, New Mexico.*

Gustafson T. et al., "Agents in their Midst: Evaluating User Adaptation to Agent-Assisted Interfaces," pp. 163-170 IUI 1998.

Feldman R., et al., "A Domain Independent Environment for Creating Information Extraction Modules," pp. 586-588, CIKM'01, 2001.

* cited by examiner

METHOD FOR AUTOMATICALLY EXTRACTING BY-LINE INFORMATION

FIELD OF THE INVENTION

The present invention generally relates to text analysis of electronic documents. More specifically, the present invention relates to identifying and designating by-lines in electronic documents such that articles can be located based on by-line information.

BACKGROUND OF THE INVENTION

The worldwide web is a continually growing, large repository of information such as online news articles. Online news articles are a useful source of worldwide information and events. The number of online news articles available on the web is growing at a rapid pace in terms of the number of web sites providing online news articles and in terms of the number of articles provided per site. An estimate for online news sources such as magazines and newspapers on the web is over 10,000. Worldwide, online news sources comprise local news sources, regional news sources, and national news sources. These news sources cater to different topics such as world news, national news, local news, business news, technical news, sports news, etc.

News sources comprise print media that also have an online presence. These news sources publish news articles daily, monthly, and sometimes also make older articles available for archival access. News sources comprise non-print media sites that provide news articles only via the web.

Given this large number of news articles appearing daily, it is becoming increasingly useful to have automated techniques and systems that can extract meaningful information from these news articles and make the extracted information available for users. Such extracted information can simplify navigation and search tasks. These automated systems (e.g., search engines) typically crawl the web periodically, pulling web pages and analyzing the contents of the web pages.

A useful task for any such system is to be able to extract by-line for each news article. A by-line is a line occurring at the beginning of an article or story typically comprising author, date, source, location, etc. By-line information is useful both for basic search and navigation among news articles. By-line information is also useful in trending analysis on the content of the articles. Queries of the form Show news articles written by author X,
Show news articles written by author X about a keyword Y,
Show news articles written by author X on date D, or
Show news articles on date D about a keyword Y comprise basic methods to search and navigate the large repository of news articles. Queries on by-line information require knowledge of the date and author of an article on the crawled web page. Furthermore, any kind of time-trending analysis on a topic requires knowledge of the date of creation for each news article on that topic.

In regular print newspapers or when visually inspected by a human, the by-line information is easily visible in the small lines that appear below or above an article headline. These small lines list the author of the article along with the date and possibly a source or place. However, finding the by-line information automatically from an html source of a web page is difficult because location of the by-line is unknown. The by-line is not explicitly mentioned or labeled. Furthermore, the crawled web pages have other items and templates around the core article. There can be other dates and person names before and after the by-line. Selecting any date or name based on location typically does not provide the desired by-line information for the article under consideration. Furthermore, different websites use different patterns for presenting by-line information and the patterns may vary over time.

One conventional approach uses a "last modified date" provided by some websites in the http header to denote the date when the page was last modified. However, web pages often comprise dynamic content such as advertisements or other templates. Consequently, the last modified date corresponds to advertisements or other templates rather than the original date of the core news article. Consequently, the "last modified date" can be unreliable for most sites.

Another conventional approach uses feeds such as a rich site summary (RSS) feed or a resource description framework (RDF) feed (referenced as feeds). Feeds often comprise the desired by-line information. However, not all news sites provide a feed; information provided in a feed is at the discretion of the content provider and some providers do not provide by-line information. Even when provided, the feeds are not free or are not available for commercial use by web page analysis systems. Furthermore, feeds may be available only for current articles and not for older archived articles. Consequently, crawling web pages is desired to include older articles in an analysis.

Yet another conventional approach looks for keyword patterns such as "By: *" or "Composed by: *" to identify an author. A keyword pattern such as "Published On: *" or "Submitted On: *" is used to identify date. This approach works well for some sites but is limited because keyword patterns change from site to site. Furthermore, no keyword exists before author/date for many sites. For example, a by-line may comprise only "John Cramer on Apr. 4, 2005".

What is therefore needed is a system, a computer program product, and an associated method for automatically extracting by-line information. The need for such a solution has heretofore remained unsatisfied.

SUMMARY OF THE INVENTION

The present invention satisfies this need, and presents a system, a computer program product, and an associated method (collectively referred to herein as "the system" or "the present system") for automatically extracting by-line information. The present system detects a set of potential headlines from a title meta-tag of a crawled document, selects a candidate headline from the set of potential headlines, and extracts the by-line information from the document by using the location of the selected candidate headline.

The present system detects the set of candidate headlines by constructing the set of potential headlines based on the title meta-tag. Constructing the set of potential headlines comprises splitting the title meta-tag at punctuation marks in the title meta-tag, thereby resulting in a set of sub-strings of the title meta-tag. The present system optionally adds bi-grams of the sub-strings and n-grams of the sub-strings to the set of potential headlines.

The present system selects a candidate headline from the set of potential headlines by evaluating the potential headlines in order of the lengths of the potential headlines. Evaluating comprises identifying a location of the selected candidate headline being evaluated in a de-tagged version of the crawled document. Evaluating further comprises verifying the selected candidate headline as comprising a complete line at the identified location in the de-tagged content. Evaluating comprises verifying the length of the selected candidate headline exceeds a minimum length in the de-tagged content.

Evaluating further comprises ensuring that the selected candidate headline comprises regular text in the de-tagged version of the document.

The present system extracts the by-line information from the document by using the location of the selected candidate headline to extract a string representing a date located within a minimum distance from the location of the potential headline. The present system further extracts by-line information by extracting a string representing a name located within a minimum distance from the location of the potential headline. The present system further extracts by-line information by extracting a string representing a source of the document located within a minimum distance from the location of the potential headline.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

HTML (Hypertext Markup Language): A standard language for attaching presentation and linking attributes to informational content within documents. During a document authoring stage, HTML "tags" are embedded within the informational content of the document. When a web server transmits the web document (or "HTML document") to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standard protocols to form a global, distributed network.

World Wide Web (WWW, also Web): An Internet client-server hypertext distributed information retrieval system.

Figure 1:
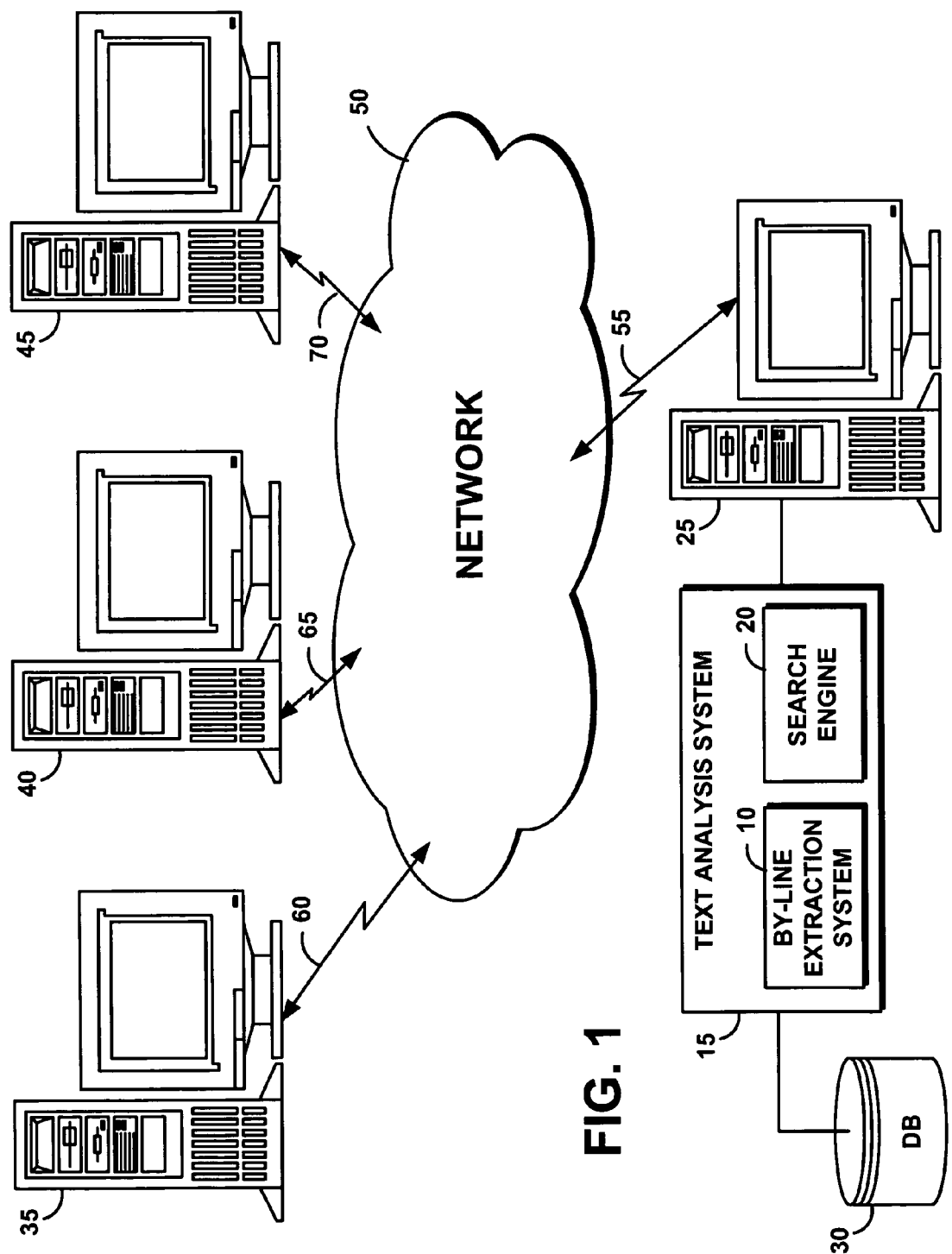
FIG. 1 is a schematic illustration of an exemplary operating environment in which a by-line extraction system of the present invention can be used.

FIG. 1 portrays an exemplary overall environment in which a system, a service, a computer program product, and an associated method (the "by-line extraction system 10" or the "system 10") for automatically extracting by-line information according to the present invention may be used. A text analysis system 15 comprises system 10 and a search engine 20. The text analysis engine 15 analyzes documents obtained from a source such as, for example, the WWW, for data analysis, trend discover, etc. The text analysis engine comprises search functionalities provided by the search engine 20. The text analysis system 15 is installed on a computer such as the host server 25.

System 10 comprises a software programming code or a computer program product that is typically embedded within, or installed on the host server 25. Alternatively, system 10 can be saved on a suitable storage medium such as a diskette, a CD, a hard drive, or like devices. A database 30 (dB 30) comprises documents from sources such as the WWW. While the system 10 will be described in connection with the WWW, the system 10 can be used with a stand-alone dB 30 of content that may have been derived from the WWW or other sources.

Users, such as remote Internet users, are represented by a variety of computers such as computers 35, 40, 45, and can access the host server 25 through a network 50. Computers 35, 40, 45, each comprise software that allows the user to interface securely with the host server 25. The host server 25 is connected to network 50 via a communications link 55 such as a telephone, cable, or satellite link. Computers 35, 40, 45, can be connected to network 50 via communications links 60, 65, 70, respectively. While system 10 is described in terms of network 50, computers 35, 40, 45, may also access system 10 locally rather than remotely. Computers 35, 40, 45, may access system 10 either manually, or automatically through the use of an application. Users query data on dB 30 via network 50 and the search engine 20.

Figure 2:
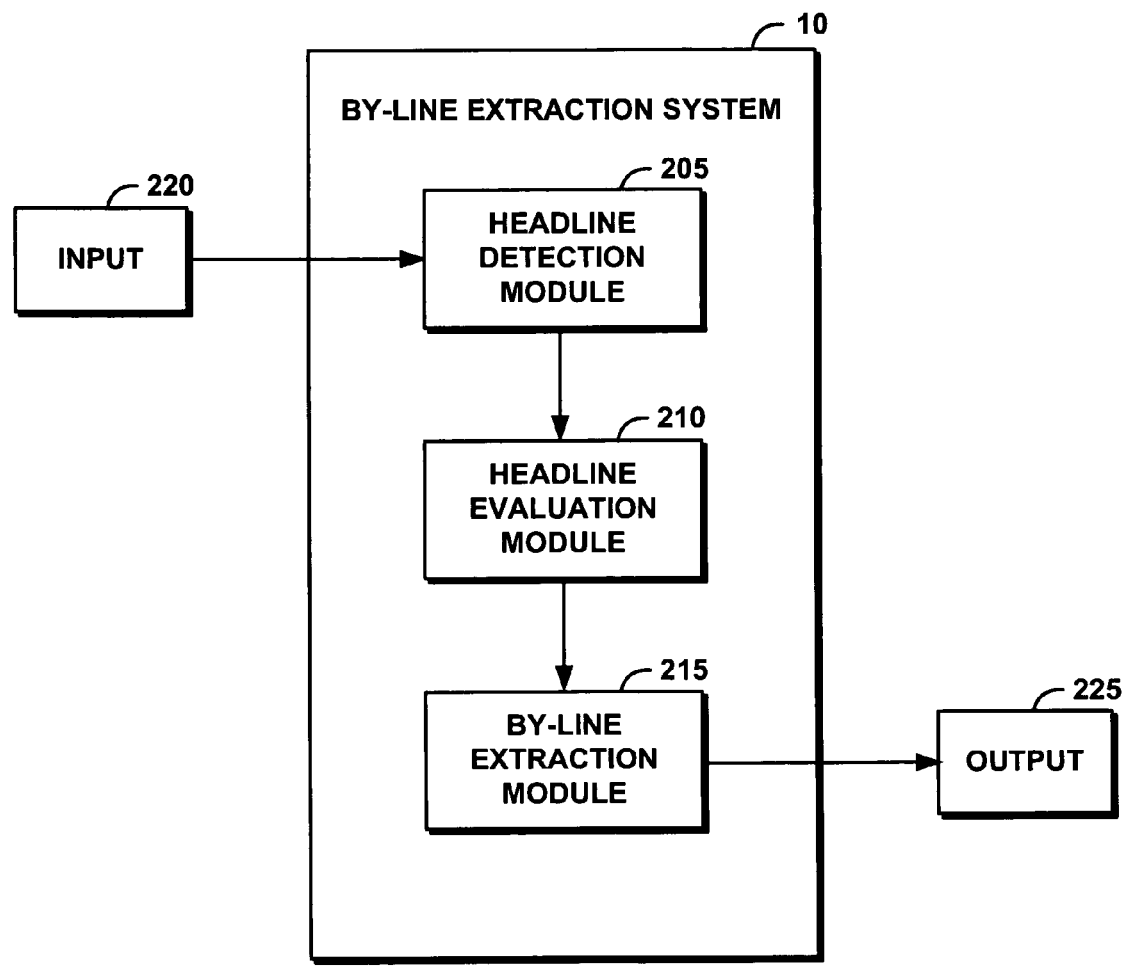
FIG. 2 is a block diagram of the high-level architecture of the by-line extraction system of FIG. 1.

FIG. 2 illustrates a high-level hierarchy of system 10. System 10 comprises a headline detection module 205, a headline evaluation module 210, and a by-line extraction module 215. Each web page comprising a news article typically comprises one headline. System 10 locates and extracts by-line information by identifying the headline in the document and locating a by-line near the identified headline.

An input 220 comprises crawled documents obtained from a source such as, for example, the WWW. Input 220 further comprises crawled documents that have html tags removed (referenced as de-tagged documents). Html tags are removed using standard de-tagging methods. An output 225 comprises identified by-line information.

Figure 3:
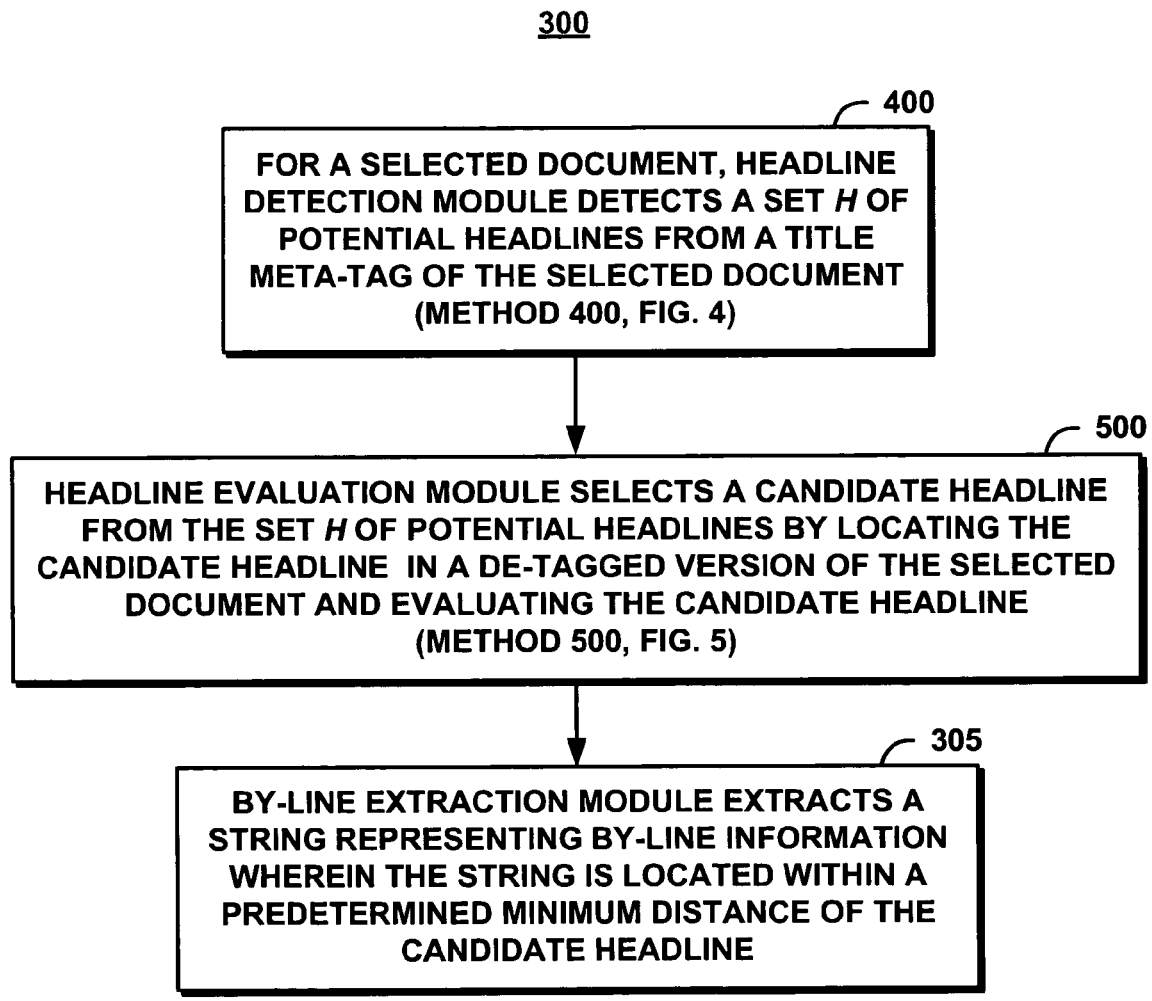
FIG. 3 is a process flow chart illustrating a method of operation of the by-line extraction system of FIGS. 1 and 2.

FIG. 3 illustrates a method 300 of operation of system 10. For a selected document, the headline detection module 205 detects a set of potential headlines from a title meta-tag of the selected document. Each selected document comprises one title meta-tag (step 400, method 400 of FIG. 4).

Exemplary title meta-tags comprise:

<title> Guardian Unlimited | Special reports | No more near misses, says new air traffic chief </title>
<title> CNN.com - Jury's still out on e-voting - Nov 5, 2004 </title>
<title> Nov. 2 the biggest test yet for touch-screen voting | csmonitor.com </title>.

The headline evaluation module 210 selects a candidate headline from the set H of potential headlines by locating the selected candidate headline in a de-tagged version of the selected document and evaluating the candidate headline (step 500, method 500 of FIG. 5).

The by-line extraction module 210 extracts a string representing by-line information (step 305). The extracted string is located within a predetermined minimum distance of the candidate headline. The extracted string may be a name, a source, a date, a location, or any other item of by-line information. The predetermined minimum distance comprises approximately 50 characters to approximately 100 characters. The predetermined minimum distance is configurable; a typical value for the predetermined distance is approximately 100 characters.

Figure 4:
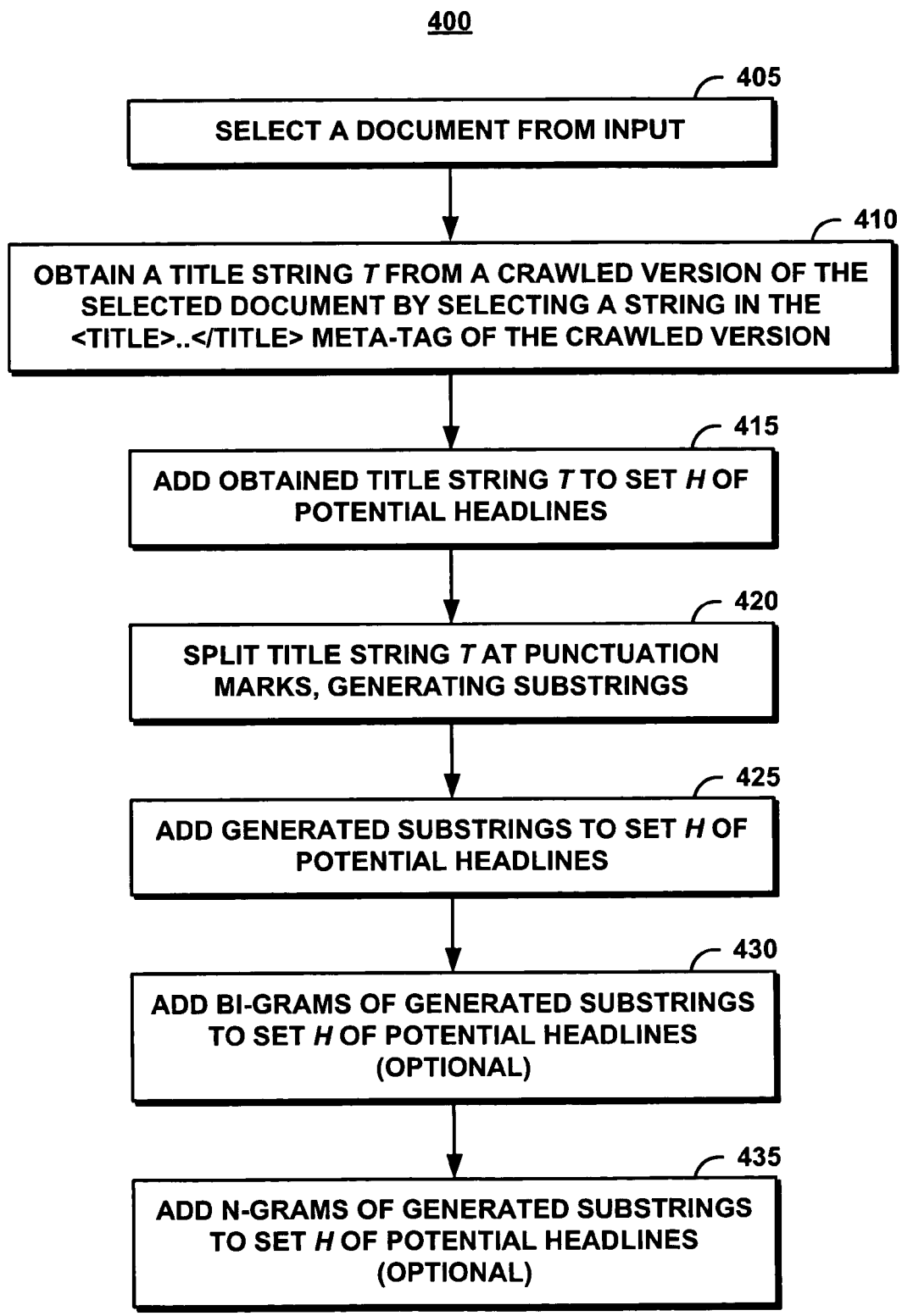
FIG. 4 is comprised of FIGS. 4A and 4B and represents a process flow chart illustrating a method of operation of a headline detection module of the by-line extraction system of FIGS. 1 and 2.

FIG. 4 illustrates a method 400 of the headline detection module 205 in detecting a set H of potential headlines. The headline detection module 205 selects a document from input 220 (step 405). The selected document comprises a crawled version and a de-tagged version. The headline detection module 205 obtains a title string T from the crawled version of the document by selecting a string in the <title> . . . </title> meta-tag of the crawled version (step 410). The headline detection module 205 adds title string T to set H of the potential headlines (step 415).

The headline detection module 205 splits the title string T at some or all punctuation marks, generating substrings (step 420). The headline detection module 205 adds the generated substrings to the set H of potential headlines (step 425). The headline detection module 205 optionally adds bi-grams of the generated substrings to the set H of potential headlines (step 430). The headline detection module 205 optionally adds n-grams of the generated substrings to the set H of potential headlines (step 435).

Figure 5A:
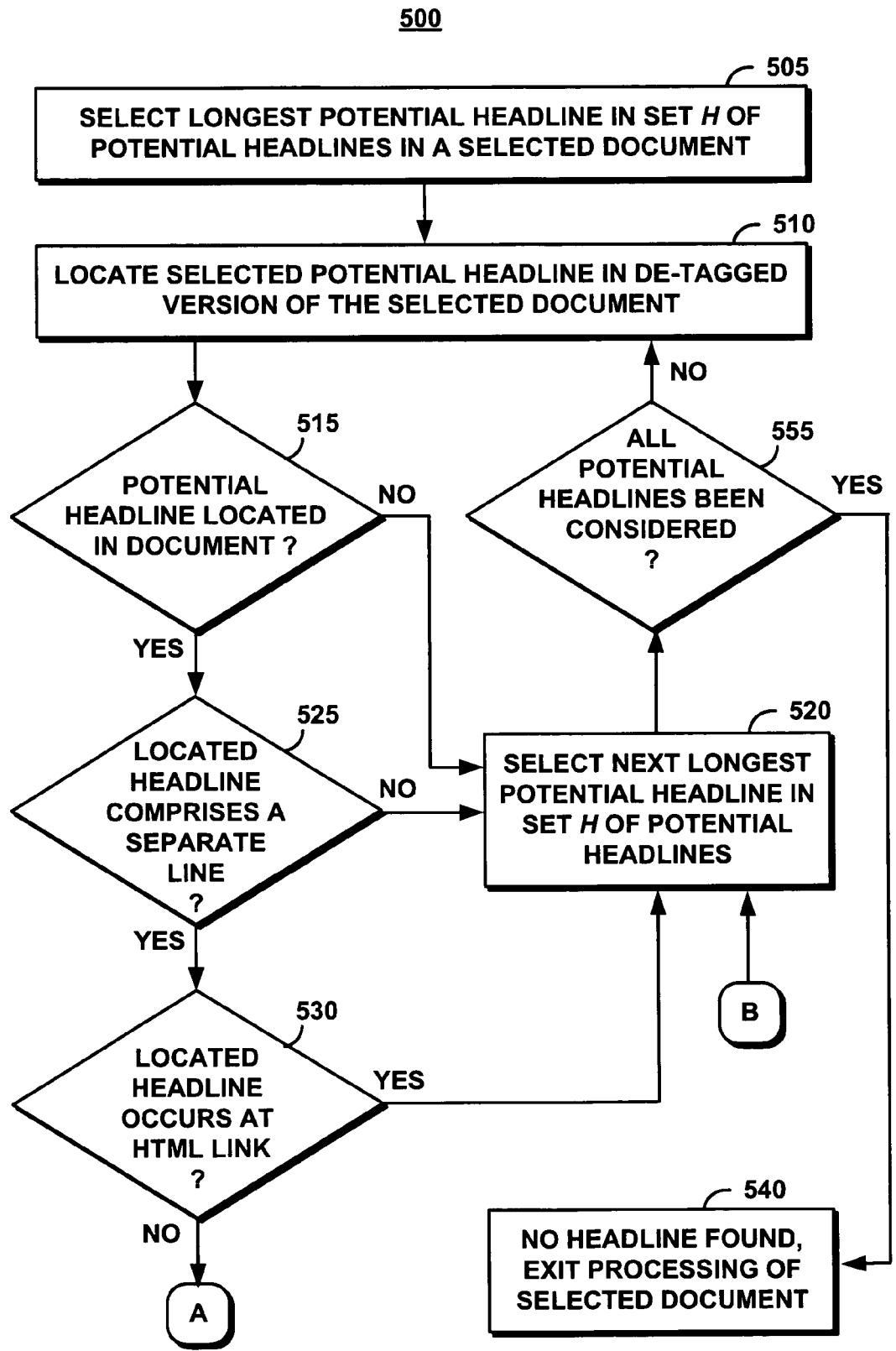
FIG. 5 is comprised of FIGS. 5A and 5B and represents a process flow chart illustrating a method of operation of a headline evaluation module of the by-line extraction system of FIGS. 1 and 2.
Figure 5B:
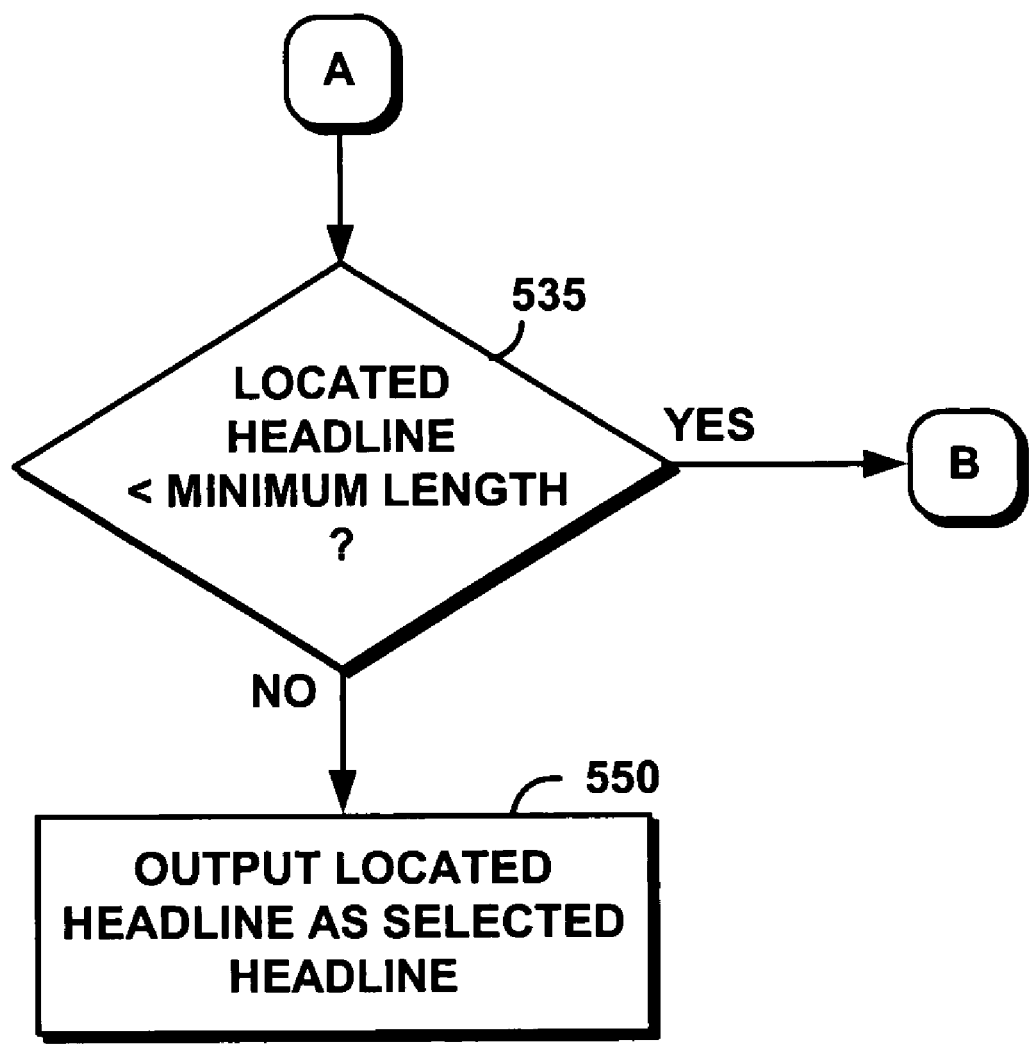

FIG. 5 (FIGS. 5A, 5B) illustrates a method 500 of the headline evaluation module 210 in selecting a candidate headline from the set H of potential headlines for a selected document by locating the selected candidate headline in the de-tagged version of the selected document and evaluating the candidate headline. The headline evaluation module 210 selects a longest potential headline in the set of H potential headlines in a selected document (step 505). The longest substring after splitting the title string on punctuations is a high-probability candidate for a headline. Other combinations are possible with a lower probability. Typically, the longest potential headline is the longest substring of title string T created when title string T is split at punctuation marks. Otherwise, the longest potential candidate may be the entire title string T.

The headline evaluation module 210 locates the selected potential headline in a de-tagged version of the selected document (step 510). If the potential headline is not located in the document (decision step 515), the located headline is not a viable headline option. The headline evaluation module 210 selects the next longest potential headline in the set H of potential headlines (step 520) and proceeds to step 555.

At decision step 555, system 10 inquires if all the potential headlines have been considered. If they have not, then system 10 proceeds to step 510. If, however, all the potential headlines have been considered, no acceptable headline is found on the selected document and system 10 exits processing of the selected document (step 540).

If the potential headline is located in the document (decision step 515), the headline evaluation module 210 determines whether the located headline comprises a separate line, with the located headline comprising the entire contents of the separate line (decision step 525). If no, the located headline is not a viable headline option. The headline evaluation module 210 selects the next longest potential headline in the set H of potential headlines (step 520) and proceeds to decision block 555 as described earlier.

Otherwise, the headline evaluation module 210 determines whether the located headline occurs at an html link (decision step 530) to ensure that the located headline comprises text only. If yes, the located headline is not a viable headline option. The headline evaluation module 210 selects the next longest potential headline in the set H of potential headlines (step 520) and proceeds to decision block 555 as described earlier.

Otherwise, the headline evaluation module 210 determines whether the located headline is less than the predetermined minimum length (decision step 535). If yes, no acceptable headline is found on the selected document and system 10 exits processing of the selected document (step 540).

Otherwise, the headline evaluation module 210 determines whether an acceptable date is found near the located headline (decision step 545). An acceptable date occurs in close proximity with the located headline with no html links or hypertext references between the date and the located headline. If no acceptable date is found, the located headline is not a viable headline option. The headline evaluation module 210 selects the next longest potential headline in the set H of potential headlines (step 520) and returns to step 510.

If an acceptable date is found, the headline evaluation module 210 outputs the located headline as the selected headline (step 550).

System 10 identifies potential headlines for a document, locates the potential headlines in a de-tagged version of the document, and validates a candidate headline based on text around the location. The title string T in the html source often has valuable clues regarding the article headline, even though the title string T is not exactly the headline.

System 10 comprises a generic automated technique for finding by-line information from a crawled web page or document comprising a news article. System 10 requires no per-site customization and has high precision and recall when the by-line information is available.

It is to be understood that the specific embodiments of the invention that have been described are merely illustrative of certain applications of the principle of the present invention. Numerous modifications may be made to the system and method for automatically extracting by-line information described herein without departing from the spirit and scope of the present invention.

What is claimed is:

1. A processor-implemented method of automatically extracting by-line information in a crawled document, wherein said document contains a single news article, comprising:

inputting the single news article wherein the single news article comprises a single title meta-tag;

removing formatting tags from the single news article to create a de-tagged version of the single news article;

detecting a set of potential headlines of the single news article from among the substrings of the single title meta-tag of the single news article and their bi-grams and n-grams, the detecting further comprising constructing the set of potential headlines based on the title meta-tag and splitting the title meta-tag at all punctuation marks in the title meta-tag, resulting in a set of sub-strings of the title meta-tag;

adding any of a plurality of bi-grams of the sub-strings and a plurality of n-grams of the sub-strings to the set of potential headlines;

selecting a candidate headline from the set of potential headlines; and extracting the by-line information from the de-tagged version of the single news article using the location of the selected candidate headline.

2. The method of claim 1 wherein selecting comprises evaluating the potential headlines in order of the lengths of the potential headlines, wherein evaluating comprises:

identifying a location of the selected candidate headline being evaluated in a de-tagged version of the single news article;

verifying the selected candidate headline as comprising a complete line at the identified location in the de-tagged content;

verifying the length of the selected candidate headline exceeds a minimum length in the de-tagged content; and ensuring that the selected candidate headline comprises regular text in the de-tagged version of the single news article.

3. The method of claim 1 wherein extracting comprises extracting a string representing a date located within a minimum distance from the location of the potential headline.

4. The method of claim 1 wherein extracting comprises extracting a string representing a name that is located within a minimum distance from the location of the potential headline.

5. The method of claim 1 wherein extracting comprises extracting a string representing a source of the document that is located within a minimum distance from the location of the potential headline.

* * * * *